United States Patent [19]
Ikemori

[11] Patent Number: 4,784,479
[45] Date of Patent: Nov. 15, 1988

[54] VARIFOCAL OPTICAL SYSTEM
[75] Inventor: Keiji Ikemori, Yokohama, Japan
[73] Assignee: Canon Kabushiki Kaisha, Tokyo, Japan
[21] Appl. No.: 737,342
[22] Filed: May 23, 1985
[30] Foreign Application Priority Data May 30, 1984 [JP]  Japan ................................ 59-110043
May 30, 1984 [JP]  Japan ................................ 59-110044

[51] Int. Cl.⁴ ............................................. G02B 15/00
[52] U.S. Cl. .................................... 350/423; 350/419
[58] Field of Search ................ 350/418, 419, 423, 427

[56] References Cited
U.S. PATENT DOCUMENTS

| | | | |
|---|---|---|---|
| 3,161,718 | 12/1964 | DeLuca ................................ | 350/419 |
| 4,407,567 | 11/1983 | Michelet et al. ..................... | 350/423 |
| 4,444,471 | 4/1984 | Ford, Jr. et al. ..................... | 350/423 |
| 4,514,048 | 4/1985 | Rogers ................................ | 350/423 |

Primary Examiner—John K. Corbin
Assistant Examiner—P. M. Dzierzynski
Attorney, Agent, or Firm—Toren, McGeady & Associates

[57] ABSTRACT

A varifocal optical system having at least two lens units A and B, the lens unit A being axially moved to vary the magnifying power, and, while it is moving, the refractive power of the lens unit B being continuously varied to compensate for the displacement of the position of the image surface caused by the variation of the magnifying power of the lens unit A, wherein variation of the refractive power of the lens unit B is made so as to maintain the constant position of a front principal point of the lens unit B when the lens unit A is in front of the lens unit B, or a rear principal point of the lens unit B when the lens unit A is at the rear of the lens unit B, relative to the image plane of the entire system.

14 Claims, 3 Drawing Sheets

VARIFOCAL OPTICAL SYSTEM

BACKGROUND OF THE INVENTION

1. Field of the Invention:

This invention relates to varifocal optical systems, and more particularly to the variation of the refractive power of at least one lens unit with which the focal length of such system varies.

2. Description of the Prior Art:

In the prior art of varifocal optical systems, when varying the image magnification, it has been the general practice that at least two lens units are made to move along a common optical axis. And determination of the space they occupy is always based on the sum of their total axial movements to avoid mechanical interference therebetween throughout the entire range of variation of the focal length. A limitation was, therefore, laid on the advance in compactness of the lens system. Also because at least one of the lens units has to be moved non-linearly throughout the range, it was difficult to operate the lens units smoothly.

Meanwhile, the inventor of this patent application has proposed an optical system having a lens of variable refractive power in U.S. patent application Ser. No. 556,705 filed Nov. 30, 1983. And the use of this lens makes it possible to eliminate the above-described drawbacks, but in to actually incorporating that lens into the optical system, alternative problems arise.

An object of the present invention is to reduce the number of movable lens units for varying the image magnification with an advantage of deleting the space which would otherwise be necessary for the movable-turned stationary lens unit, whereby a compact optical system as a whole is achieved.

Another object is to eliminate the drawback arising from the use of a lens of variable refractive power as a constitutent element of a thick lens system. In this connection, it should be noted that as the refractive power of the lens varies by varying the radius or radii of curvature of either or both of the surfaces thereof and its axial thickness, the principal points of the lens change their places. And the displacement of the principal points often tends to complicate the structure of the optical system.

Still another object is that the variation of refractive power which contributes mainly to variation of the image magnification is imposed on movement of the lens unit, and the variation of relatively weak refractive power which compensates for the shift of the image plane is imposed on deformation of the lens shape, whereby the image quality is prevented from lowering due to the great degree of distortion of the lens shape.

A further object is to make it possible to perform variation of the image magnification by linearly moving a movable lens unit, whereby a simplification of the lens barrel is achieved.

SUMMARY OF THE INVENTION

A varifocal optical system including a movable lens unit movable along an optical axis; a compensation lens unit having principal points, whose refractive power varies and compensates for the shift of an image surface resulting from the movement of the movable lens unit; and an image plane; whereby the refractive power of the compensation lens unit varies in such a way that one of the principal points which has relation to the movable lens unit is maintained at substantially the same position relative to the image plane. Also the movable lens unit is made to move according to a rule determined of itself without being influenced by the variation of the refractive power of the lens unit of variable refractive power, whereby a simplification of the operating mechanism for the varifocal optical system is achieved.

DETAILED DESCRIPTION OF THE PREFERRED EMBODIMENTS

A first embodiment of the varifocal optical system according to the present invention comprises at least two lens units A and B, the lens unit A being axially moved to vary the focal length of the entire system, and, while it is moving, in order to maintain constant the position of an image plane of the entire system, the refractive power of the lens unit B is varied continuously in such a way that one of the principal points of the lens unit B which has optical relation to the lens unit A, for example, the rear principal point in the case of the lens unit B being in front of the lens unit A, or the front principal point in the case of the lens unit B being at the rear of the lens unit A, is held constant at a distance from the image plane of the entire system.

By imparting such a variation of the refractive power into the lens unit B, the necessity of varying the fundamental optical arrangement of the lens units A and B can be removed, thereby it is possible to construct the optical system and a mechanical mounting therefor in a simple form.

Figure 1:
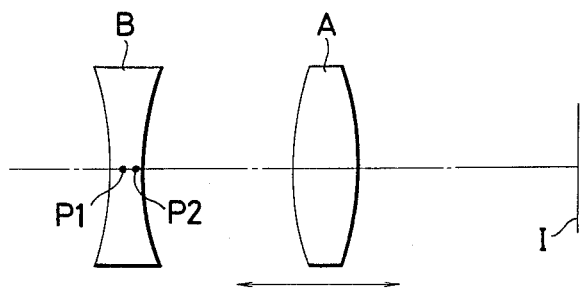
FIG. 1 is a sectional view of the optics in a first embodiment of the invention.
Figure 2:
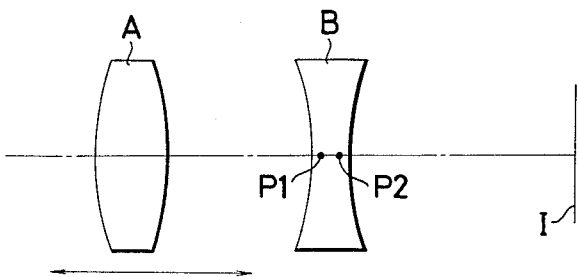
FIG. 2 is a sectional view in the optics of a second embodiment of the invention.

In FIGS. 1 and 2, reference symbol A denotes the lens unit composed of an ordinary lens or lenses and arranged to move axially during zooming, reference symbol B denotes the variable power lens unit made of elastic material, for example, silicon rubber, and held substantially stationary during zooming. Front and rear principal points of the varible power lens unit B are indicated by P1 and P2 respectively. Reference symbol I represents an image plane.

Let us now consider the varifocal optical system of FIG. 1 with the two lens units A, B of which the first counting from the front is the lens unit B and the second is the lens unit A. In the start point, their refractive powers are assumed to have values $\phi_B$ and $\phi_A$ respectively and the interval between their principal points to be a value E. Here, for a distance of "t" the lens unit A moves, in order to maintain constant the position of the image plane I of the varifocal optical system, the refractive power of the lens unit B must be changed to another value $\phi_B$ determined by the following formula:

$$\phi_B' = \frac{a}{A(E+t) - (SK-t)}$$

where $$a = (SK-t)\phi_A - 1$$

$$SK = \frac{1 - E\phi_B}{\phi_B + (1 - E\phi_B)\phi_A}$$

The sign of the distance "t" is positive when it moves rearward.

Taking a numerical example of the initial power arrangement of the varifocal optical system in $\phi_B = -1/50$, $\phi_A = 1/35$ and $E = 35$, when the lens unit A moves forward to vary a focal length "f" of the entire system, the required values $\phi_B'$ of the refractive power of the lens unit B for a series of values of the focal length "f" are listed in Table 1. Under the prerequisite to maintain the constant position of one of the principal points P1, P2 of the lens unit B which faces at the lens unit A, that is, in this instance, the rear principal point P2, relative to the image plane of the entire system, with the lens unit B in the form of, for example, a bi-concave singlet lens having a refractive index $n = 1.5$ with front and rear surfaces R1 and R2, and an axial thickness $d = 55$, as the refractive power of the lens B changes, the radii of curvature of its front and rear surfaces R1, R2 must be changed from the initial values $R1 = -55$ and $R2 = 50$ as shown in Table 1 below.

In this example, the rear principal point P2 lies at a distance of 5 as measured forward from the second lens surface R2.

TABLE 1

| f | t | E | $\phi_B'$ | R1 | R2 |
|---|---|---|---|---|---|
| 35 | 0 | 35 | −0.02 | −55 | 50 |
| 39.214 | −5 | 30 | −0.0214936 | −51.52547 | 46.52548 |
| 44.857 | −10 | 25 | −0.0719745 | −50.50730 | 45.50729 |
| 51.929 | −15 | 20 | −0.0217331 | −51.01276 | 46.01276 |
| 60.429 | −20 | 15 | −0.0210401 | −52.52829 | 47.52829 |
| 70.357 | −25 | 10 | −0.0201014 | −54.74778 | 49.74778 |

In the practical example of Table 1, a varifocal optical system which enables its focal length to be changed from 35 to 70.357 mm, leaving the image plane I unchanged in position, by axially moving the lens unit A while varying the refractive power of the lens unit B continuously is attained.

Figure 3:
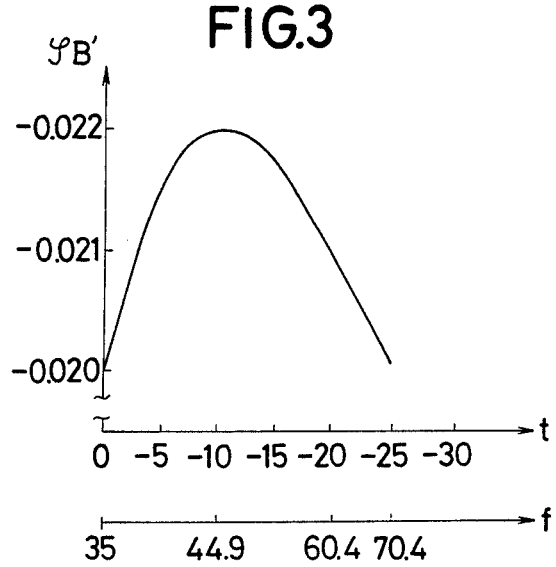
FIG. 3 is a graph illustrating variation of the refractive power.

The relationship between the refractive power $\phi_B'$ and the distance "t" or a focal length "f" in the numerical example of Table 1 is graphically shown in FIG. 3.

It will be appreciated that while, in the prior art, any varifocal optical system is necessarily included with at least two axially movable lens units for which an in-and-out cam is used, in the present invention a directional cam suffices for the only one axially movable lens unit A since the lens unit B is held stationary although the refractive power of the latter is varied according to a prescribed rule. Thus, a varifocal optical system for which the operating mechanism is a simple structure is attained.

Though the foregoing embodiment has been described in connection with the lens units B and A arranged in this order from the front, they may be exchanged in position as shown in FIG. 2 where the first or front lens unit A moves axially to vary the focal length of the entire system, and the refractive power of the rear lens unit B is varied in such a way that not only one of the principal points of the lens unit B which is nearer to the lens unit A as has been stated above, in this instance, the front principal point P1, but also the rear principal point P2 is maintained at a constant distance from the image plane I of the entire system. Even in this case, the objects of the invention can be accomplished.

In this connection, it should be noted that the lens unit B is formed by two or more lenses of which any two have variable refractive powers with the front and rear principal points P1, P2 respectively at constant distances from the image plane I of the entire system.

The method of varying the refractive power of a lens may be, for example, by deforming an elastic transparent block, for example, that of natural rubber projecting outward from an aperture of the container for the block to convex shapes, or sinking out of the aperture to concave shapes. With this, the optical surfaces of the elastic block at the apertures on opposite side of the container, namely, the lens surfaces, vary in the radius of curvature, and the lens thickness too varies. The elastic block usable for this purpose requires that when a pressure is applied, it deforms, and, insofar as the applied pressure is not too large (within the limits of elasticity), after the pressure is removed, it reverts to its original form.

Figure 4:
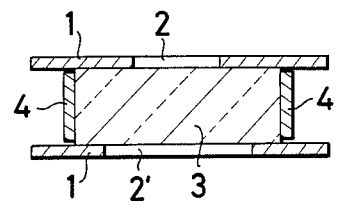
FIGS. 4, 5 and 6 are sectional views illustrating a method of varying the refractive power.
Figure 5:
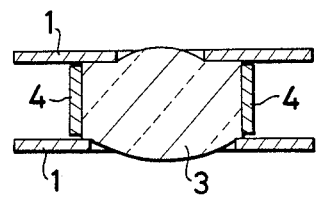
Figure 6:
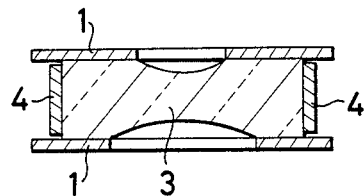

FIGS. 4 to 6 illustrate a practical example of the variable power lens made of the above-described elastic block. In these figures, reference numeral 1 identifies a cylindrical container having round apertures 2 and 2' of different diameters in opposite walls thereof. Reference numeral 3 identifies a transparent elastic block, and 4 movable members for applying pressure to the elastic block 3.

In the position of FIG. 4, the block 3 takes its own form since no pressure is applied thereto. When the movable members 4 are pushed inward, the exposed surfaces of the block 3 at the apertures 2 and 2' bend outward to respective extents depending on the diameter of the aperture 2, 2' and the magnitude of the pressure. As a result a convex lens is formed. Conversely, when a negative pressure is applied to the black 3 through the movable members 4, a concave lens is formed as shown in FIG. 6.

In such a manner, the radius of curvature of each of the lens surfaces and the lens thickness can be varied by controlling the magnitude of the pressure applied on the movable members 4, 4 of the container 1 and the size of each of the apertures 2, 2'. Note, though in the illustrated example, both of the surfaces of the elastic lens are allowed to deform, one of them may be made flat, as the corresponding wall of the container 1 is made of a glass plate.

The confronting surfaces of the block 3 and the movable members 4 are fixedly secured to each other by an adhesive agent or the like.

The means for driving the movable members 4 to apply pressure to the elastic block 3 may be of any type. As the simplest means, mentioned may be made of screw-threaded drive rods between the container 1 and the movable member 4, or an electromagnetically operated positioning device for the movable member 4.

Another method of forming the lens of variable power is to make a transparent elastic block 3 of which the interior is hollow, and to fill the interior with a liquid or gas of a different refractive index from that of air. To vary the refractive index of such a lens, the pressure of the interior is controlled to vary the radii of curvature of the lens surfaces.

Figure 7:
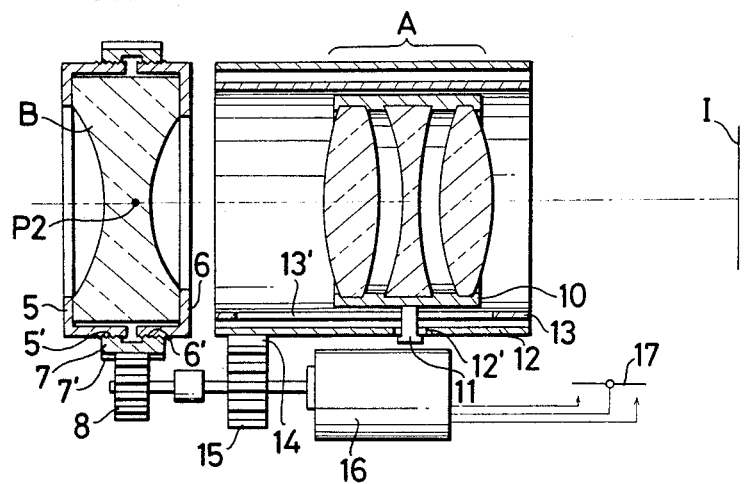
FIG. 7 is a sectional view of a mechanism for use in varying the image magnification.

FIG. 7 depicts a practical example of a mechanism for moving the lens unit A and for varying the refractive power of the lens unit B. The lens unit B is a bi-concave singlet lens made of elastic material. The edge of the lens is adhered to a radial extension of each of front and rear barrels 5 and 6. Helicoids 5' and 6' are formed in the outer surfaces of the barrels 5 and 6 respectively and mesh with respective helicoids of a zoom ring 7. Also, these helicoids 5', 6' are of opposed orientation so that as the zoom ring 7 rotates in one direction, the front and rear barrels 5 and 6 move in opposite directions. Furthermore their helicoid pitches are different from each other so that the rear principal point P2 of the lens unit B is maintained in the constant position relative to the image plane I. The zoom ring 7 has a geared portion 7' formed in the outer surface thereof and which meshes with a first drive gear 8. The lens unit A is contained in a cell 10. A drive pin 11 extending radially outwardly from the cell 10 passes through an axially elongated linear camming slot 13' of a guide sleeve 13 and enters an inclined camming slot 12' of a cam sleeve 12. As the cam sleeve 12 rotates, the drive pin 11 moves axially. The cam sleeve 12 has a geared portion 14 formed in the front end of the outer surface thereof, and meshes with a second drive gear 15. The first and second drive gears 8 and 15 are rotated by a common electric motor 16. A seesaw switch 17 controls the stoppage, normal rotation and reverse rotation of the motor 16.

In operating the mechanism of such a construction, when the motor 16 rotates, the first and second drive gears 8 and 15 are rotated. Rotation of the second drive gear 15 causes rotation of the cam sleeve 12 which is transmitted by the drive pin 11 to axial movement of the lens unit A. As this lens unit A moves, the focal length of the entire system varies, or the image magnification varies, but the image plane I is displaced.

The first drive gear 8 which rotates in synchronization with the second drive gear 15 rotates the zoom ring 7 by which the front and rear lens barrels 5 and 6 are moved, for example, farther away from each other. As the marginal zones of the front and rear surfaces R1, R2 of the lens unit B are pulled forward and rearward respectively, the radii of curvature of both lens surfaces R1, R2 decrease and the axial thickness also varies. Thus, the refractive power varies to compensate for the shift of the image plane I.

Figure 8:
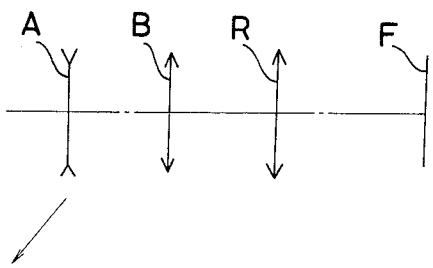
FIG. 8 is a schematic diagram in the optics of another embodiment of the invention.

FIG. 8 illustrates another practical example of the varifocal optical system including at least three lens units A, B and R in this order from the front, the lens unit R being of positive refractive power, the lens unit A being axially moved to vary the image magnification, and the lens unit B being continuously variable in refractive power to compensate for the image shift and producing an almost afocal bundle of light, wherein the refractive power of the lens unit B varies in such a way that the front principal point P1 of the lens unit B is maintained at a constant distance from the image plane I of the entire system.

By making almost afocal the rays of light emerging from the lens unit B, the rear principal point P2 is allowed to change its position freely as the refractive power of the lens unit B varies, thereby giving advantages of increasing the degree of freedom of design and simplifying the optical system.

Also by arranging the lens unit R of positive refractive power for forming an image, it is possible to achieve correction of aberrations throughout the entire zooming range.

Next, for the purpose of simplifying the optical design, the varifocal optical system including three lens units A, B, R preceded newly by a lens unit F for focusing, or the most typical or so-called 4-component zoom lens including four lens units in total, is described below.

Figure 9:
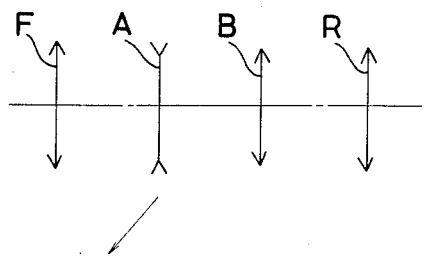
FIG. 9 is a schematic diagram of the optics in another embodiment of the invention.

As shown in FIG. 9, the four lens units are referred to as, from front to rear, the lens unit F, lens unit A, lens unit B and lens unit R, their refractive powers are denoted respectively by $\phi_F$, $\phi_A$ $\phi_B$ and $\phi_R$, and the intervals between the principal points of the successive two lens units are denoted by $e_1$, $e_2$ and $e_3$. The lens unit F, lens unit A and lens unit B are assumed to form an afocal system.

Now, when the lens unit A moves a distance of "t", the required refractive power $\phi_B'$ of the lens unit B for maintaining constant the position of the image plane of the entire system is obtained by the following formula:

$$\phi_{B'} = \frac{1}{SK} - \frac{A_3}{H_3}$$

where $$SK = \frac{1 - e_1 \cdot \phi_F - e_2 \{\phi_F + (1 - e_1 \cdot \phi_F) \phi_A\}}{\phi_F + (1 - e_1 \cdot \phi_F) \phi_A + [1 - e_1 \cdot \phi_F - e_2 \{\phi_F + (1 - e_1 \cdot \phi_F) \phi_A\}] \phi_B}$$

$$A_3 = \phi_F + \{1 - (e_1 + t) \phi_F\} \phi_A$$

$$H_3 = 1 - (e_1 + t) - (e_2 - t) A_3$$

As a numerical example, a varifocal optical system has its initial refractive power arrangement at $\phi_F = 1/100$ $\phi_A = -1/35$, $\phi_B = 1/95.702$, $\phi_R = 1/113.973$, $e_1 = 9.5$, $e_2 = 42$, $e_3 = 10$. For the distance "t" the lens unit A moves rearward, the numerical data of the refractive power $\phi_B'$ of the lens unit B and the focal length "f" of the entire system are given in Table 2. With the lens unit B, for example, in the form of a biconvex singlet lens, for the front principal point P1 of the lens B is maintained at a constant distance from the image plane I of the entire system, the radii of curvature of the front and rear surfaces R1, R2 of the lens B must vary from the initial values R1=95.69378 and R2=−100.6938 at a refractive index of n=1.5 and a lens thickness of d=15 as shown in Table 2 below.

In this example, the front principal point P1 lies at a distance of 5 from the first lens surface R1.

TABLE 2

| f | t | $e_1$ | $e_2$ | $\phi_{B'}$ | R1 | R2 |
|---|---|---|---|---|---|---|
| 70 | 0 | 9.5 | 42 | 0.01045 | 95.69378 | −100.6938 |
| 78.623 | 5 | 14.5 | 37 | 0.01084 | 92.25092 | −97.25092 |
| 88.762 | 10 | 19.5 | 32 | 0.01123 | 89.04720 | −94.04720 |
| 114.913 | 20 | 29.5 | 22 | 0.01192 | 83.89262 | −88.89262 |

TABLE 2-continued

| f | t | $e_1$ | $e_2$ | $\phi_B'$ | R1 | R2 |
|---|---|---|---|---|---|---|
| 151.649 | 30 | 39.5 | 12 | 0.01227 | 81.49959 | −86.49959 |
| 202.350 | 40 | 49.5 | 2 | 0.01176 | 85.03401 | −90.03401 |

As will be seen from Table 2, a varifocal optical system whose focal length is varied from 70 to 202.35 mm by moving the lens unit A 40 mm axially, while maintaining the constant position of the image plane by continuously varying the refractive power $\phi_B'$ of the lens unit B is attained in this example.

Figure 10:
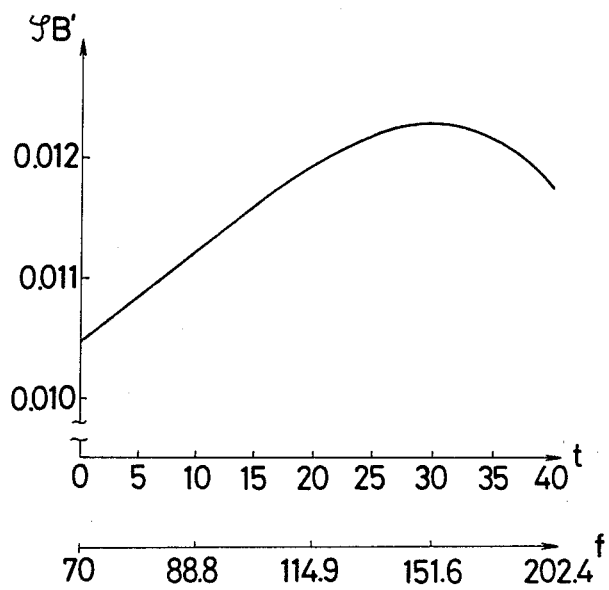
FIG. 10 is a graph illustrating variation of the refractive power.

The relationship between the refractive power $\phi_B'$ of the lens unit B, and the distance "t", or the focal length "f" in the numerical example of Table 2 is graphically shown in FIG. 10.

Like this, whilst the prior art necessitates at least two axially movable lens units including the one of non-linear motion for realizing a varifocal optical system, it is in the present invention that only one axially movable lens unit A of linear motion suffices for an equivalent varifocal optical system, as the refractive power of the fixed lens unit B varies as a prescribed function of the movement of the lens unit A, thereby giving an advantage of forming the operating mechanism of far less stress.

For note, though the foregoing embodiment has been described in connection with the 4-component zoom lens, it is to be understood that without having particularly to use the front lens unit F, it is of course possible for a 3-component zoom lens to accomplish the objects of the invention.

What can only be said of the 4-component zoom lens is that because of its having the lens unit F for focusing purposes, such zoom type is favorable to form the lens system of the invention from the standpoint of facilitating aberration correction.

What is claimed is:

1. A varifocal optical system comprising:
   a movable lens unit movable along an optical axis, said movable lens unit having a positive refractive power;
   a compensation lens unit having principal points, said compensation lens unit having a variable negative refractive power which varies and compensates for the shift of an image surface resulting from the movement of said movable lens unit;
   an image plane; and
   means for varying the refractive power of said compensation lens unit in such a way that the principal point at said movable lens unit side of said principal points maintains a substantially same position relative to said image plane.

2. A varifocal optical system according to claim 1, wherein
   said movable lens unit lies on an image side of said compensation lens unit.

3. A varifocal optical system according to claim 1, wherein said movable lens unit lies on an object side of said compensation lens unit, and the other of said principal points is maintained substantially at a same position relative to said image plane over an entire range of variation of the refractive power of said compensation lens unit.

4. A varifocal optical system according to claim 1, further comprising
   an image forming lens unit in a rearmost position, and wherein
   said movable lens unit lies on a object side of said compensation lens unit, and a rays of light emerging from said compensation lens unit are made substantially afocal.

5. A varifocal optical system according to claim 4, further comprising:
   a lens unit of positive refractive power on an object side of said movable lens unit.

6. A varifocal optical system according to claim 1, wherein
   said compensation lens unit has its refractive power varied by varying radii of curvature of a frontmost lens surface and a rearmost lens surface and an axial thickness.

7. A varifocal optical system according to claim 6, wherein
   said compensation lens unit is made of elastic material.

8. A varifocal optical system comprising:
   a movable lens unit of negative refractive power, movable along an optical axis;
   a compensation lens unit of variable positive refractive power, having principal points, and compensating for the shift of an image surface resulting from the movement of said movable lens unit;
   an image plane; and
   means for varying the refractive power of said compensation lens unit in such a way that the principal point at said movable lens unit side of said principal points maintains a substantially same position relative to said image plane.

9. A varifocal optical system according to claim 8, wherein said movable lens unit lies on an image side of said compensation lens unit.

10. A varifocal optical system according to claim 8, wherein said movable lens unit lies on an object side of said compensation lens unit, and the other of said principal points is maintained substantially at a same positive relative to said image plane over an entire range of variation of the refractive power of said compensation lens unit.

11. A varifocal optical system according to claim 8, further comprising:
    an image forming lens unit in a rearmost position, and wherein said movable lens unit lies on an object side of said compensation lens unit, and rays of light emerging from said compensation lens unit are made substantially afocal.

12. A varifocal optical system according to claim 11, further comprising:
    a lens unit of positive refractive power on an object side of said movable lens unit.

13. A varifocal optical system according to claim 8, wherein said compensation lens unit has its refractive power varied by varying radii of curvature of a frontmost lens surface and a rearmost lens surface and an axial thickness.

14. A varifocal optical system according to claim 13, wherein said compensation lens unit is made of elastic material.

* * * * *